United States Patent [19]

Takada et al.

[11] Patent Number: 5,160,216
[45] Date of Patent: Nov. 3, 1992

[54] DRAINAGE DISTRIBUTION AMOUNT DETERMINING METHOD AND DRAINAGE SYSTEM

[75] Inventors: Kunio Takada, Ibaraki; Kenji Otani, Tsuchiura; Akira Manabe, Ibaraki, all of Japan

[73] Assignee: Hitachi, Ltd., Tokyo, Japan

[21] Appl. No.: 770,343

[22] Filed: Oct. 3, 1991

[30] Foreign Application Priority Data

Oct. 3, 1990 [JP] Japan ................... 2-265977

[51] Int. Cl.$^5$ ............... E02B 7/20; E02B 7/40
[52] U.S. Cl. ................... 405/92; 137/386; 405/37; 405/52
[58] Field of Search ............ 405/91–96, 405/87, 52, 36, 37; 137/386, 392; 364/182, 183, 177

[56] References Cited

U.S. PATENT DOCUMENTS

| | | | |
|---|---|---|---|
| 3,922,564 | 11/1975 | Kachuk et al. | 137/292 |
| 4,036,023 | 7/1977 | Matsumoto et al. | 405/92 |
| 4,332,507 | 6/1982 | Wakamori et al. | 405/92 |
| 4,478,534 | 10/1984 | McIlwain | 405/96 |
| 4,498,809 | 2/1985 | Farmer | 405/92 |
| 4,522,534 | 6/1985 | Wakamori et al. | 405/92 |
| 4,604,681 | 8/1986 | Sakashita | 405/92 X |

FOREIGN PATENT DOCUMENTS 0016206  2/1981  Japan ................... 405/92

Primary Examiner—Dennis L. Taylor
Attorney, Agent, or Firm—Antonelli, Terry, Stout & Kraus

[57] ABSTRACT

In a drainage system wherein drain water is collected from a drainage path including a small river, guided to a plurality of drainage pump facilities, and drained into a destination river, a drainage distribution amount is determined for each of the plurality of drainage pump facilities in accordance with an actual precipitation or estimated precipitation, a river water level at a drainage point of each of the plurality of drainage pump facilities is estimated in accordance with the drainage distribution amount and a change in a detected water level at an upstream of the destination river, and the drainage distribution amount for each of the plurality of drainage pump facilities is corrected so as to make the estimated river water level have a value equal to or smaller than an upper limit of the river water level at the drainage point.

9 Claims, 5 Drawing Sheets

DRAINAGE DISTRIBUTION AMOUNT DETERMINING METHOD AND DRAINAGE SYSTEM

BACKGROUND OF THE INVENTION

The present invention relates to a drainage system wherein drain water is collected from a drainage path including a small river, guided to a plurality of drainage pump facilities, and drained into a destination river. More particularly, the present invention relates to a drainage distribution amount determining method and drainage system using the method particularly suitable for a broad area drainage system in or around an urban district.

In a conventional drainage system of this type, drainage pump facilities are automatically operated while controlling the drainage amounts independently from each other so as to maintain the water level (hereinafter called an inside water level) of each pump pool or sump within a predetermined range. One type of such a conventional drainage system is described in Japanese Patent Laid-Open Publication JP-A-2-115584.

The above-described conventional technique does not consider the water level (hereinafter called an outside water level) of a destination river. Therefore, there arises a problem that the outside level at a drainage point or at the downstream of the drainage point (hereinafter collectively called a drainage point) rises to exceed the upper limit of the outside water level.

The above problem can be solved by reducing the drainage amount at the drainage pump facility exceeding the upper limit and distributing the reduced drainage amount to another drainage pump facility which has a marginal drainage amount relative to its upper limit. However, as described above, drainage pump facilities are automatically operated while controlling the drainage amounts independently from each other so as to maintain the inside water levels within a predetermined range. Therefore, such a control of distributing a drainage amount cannot be performed.

SUMMARY OF THE INVENTION

It is an object of the present invention to provide a drainage distribution amount determining method and a drainage system using the method, capable of solving the above problem, and determining an optimum drainage amount at each drainage pump facility so as not to make the river water level at a drainage point exceed the upper limit, by organically operating a plurality of drainage pump facilities.

In order to achieve the above object, the prevent invention provides a method of determining a drainage distribution amount for a drainage system wherein drain water is collected from a drainage path including a small river, guided to a plurality of drainage pump facilities, and drained into a destination river, the method comprising the steps of: determining a drainage distribution amount for each of the plurality of drainage pump facilities in accordance with an actual precipitation or estimated precipitation; estimating a river water level at a drainage point of each of the plurality of drainage pump facilities in accordance with the drainage distribution amount and a change in a detected water level at an upstream of the destination river; and correcting the drainage distribution amount for each of the plurality of drainage pump facilities so as to make the estimated river water level have a value equal to or smaller than an upper limit of the river water level at the drainage point.

Correcting the drainage distribution amount for each of the plurality of drainage pump facilities can be conducted by controlling a dam or gate provided at a water conducting path for conducting drain water to each of the plurality of drainage pump facilities.

In a drainage system wherein drain water guided to a plurality of drainage pump facilities is drained to a plurality of destination rivers, it is preferable that when the estimated water level at a drainage point at one of the plurality of destination rivers exceeds the upper limit, the drainage distribution amount for the plurality of drainage pump facilities at the others to the plurality of destination rivers is preferentially corrected by increasing the drainage distribution amount.

In a drainage system having a drainage path including a small river into which drain water such as a rainwater flows, a plurality of drainage pump facilities disposed near a destination river, and a plurality of water conducting paths branched from the drainage path for guiding the drain water to the plurality of drainage pump facilities from which the drain water is drained into the destination river, the drainage system of the present invention comprises: total inflow amount estimating unit for estimating a total inflow amount of the drain water flowing into the plurality of drainage pump facilities in accordance with an actual precipitation or estimated precipitation; water level detecting unit disposed at an upstream of the destination river; reference river water level estimating unit for estimating a reference river water level at a drainage point at each of the plurality of drainage pump facilities in accordance with an output from the water level detecting unit; drainage distribution amount determining unit for determining a drainage distribution amount for each of the plurality of drainage pump facilities in accordance with the estimated total inflow amount and a drainage capacity at each of the plurality of drainage pump facilities; and drainage amount correcting unit for estimating a river water level at a drainage point at each of the plurality of drainage pump facilities in accordance with the determined drainage amount and the estimated reference river water level, comparing the estimated river water level with an upper limit of the river water level at the drainage point, and if there is the drainage point having the estimated river water level in excess of the upper limit, correcting the determined drainage distribution amount so as to make the drainage point have the estimated river water level not in excess of the upper limit.

In a drainage system wherein drain water guided to a plurality of drainage pump facilities is drained to a plurality of destination rivers, it is preferable that the drainage amount correcting unit corrects the drainage amount for the plurality of drainage pump facilities at the drainage point at the plurality of destination rivers other than the destination river having the estimated drainage value in excess of the upper limit, by increasing the drainage amount.

It is also preferable that at least one of a dam and gate is adjusted in accordance with the drainage distribution amount at each drainage pump facility, so as to maintain the water level of a pump pool within a predetermined range.

With the method and system constructed as above, the above object can be achieved by the following operation.

An amount of drain water flowing into a drainage path can be easily estimated from an actual precipitation or estimated precipitation. The amount of drain water branching into the water conducting path from the drainage path can also be estimated from the inside water level at each drainage pump facility and a flow path resistance such as an inflow resistance at a dam or gate at each water conducting path. A maximum drainage capacity of each drainage pump facility is known. Therefore, in accordance with these parameters, an optimum drainage distribution amount for each drainage pump facility of the drainage system can be determined.

Next, it is estimated if the determined drainage amount exceeds the upper limit of a river water level. If it exceeds, the drainage distribution amount for each drainage pump facility is corrected. In this manner, it is possible to determine an optimum drainage distribution amount for each drainage pump facility which will not exceed the upper limit of the river water level. Such correction of a drainage distribution amount can solve the problem of a drainage point in excess of the upper limit, in the following cases. For example, (1) the case wherein if the river is wider at a downstream drainage pump facility than at an upstream drainage pump facility, the drainage amount at the downstream drainage pump facility is increased, (2) the case wherein it is anticipated that the water amount will be reduced abruptly at a downstream within a predetermined time period before the drain water at an upstream reaches the downstream, (3) the case wherein if there are two or more destination rivers, the drainage amount is distributed to the destination river having a marginal drainage capacity not reaching the upper limit, and other cases.

Furthermore, at least one of a dam and gate is adjusted in accordance with the drainage distribution amount at each drainage pump facility, so as to maintain the water level of a pump pool within a predetermined range. Therefore, it is possible to provide a drainage system having a balanced state between a drainage amount and an inflow amount at each drainage pump facility.

DESCRIPTION OF THE PREFERRED EMBODIMENTS

Preferred embodiments of the present invention will be described with reference to the accompanying drawings.

Figure 1:
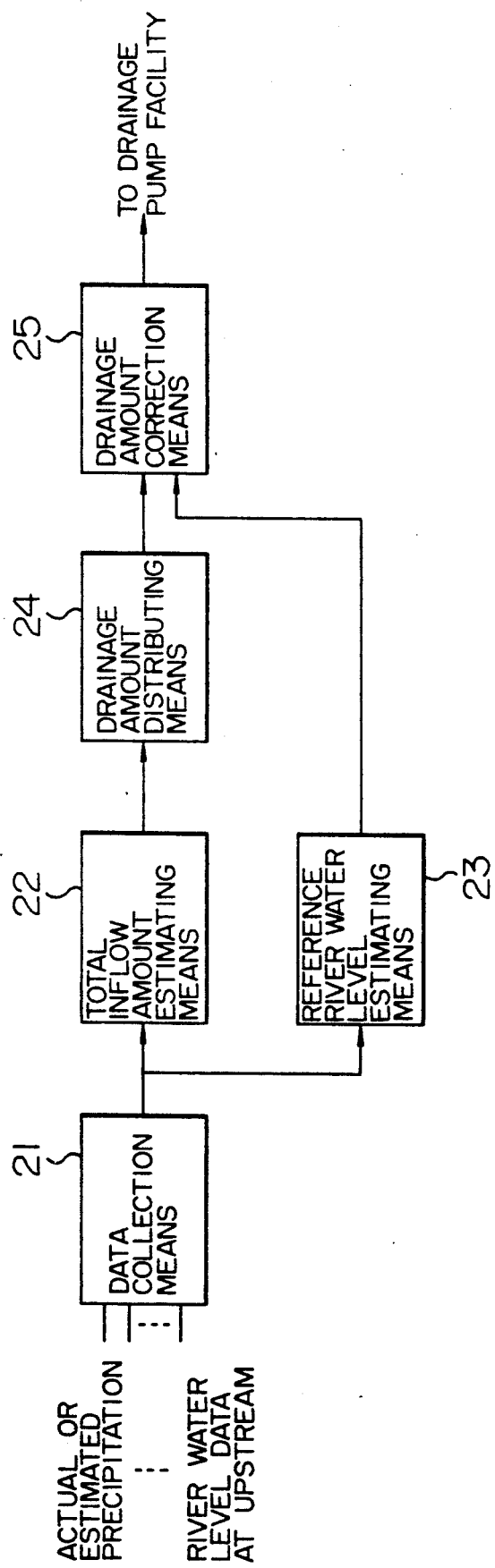
FIG. 1 is a block diagram showing the structure of a drainage distribution amount determining apparatus according to an embodiment of the present invention.
Figure 2:
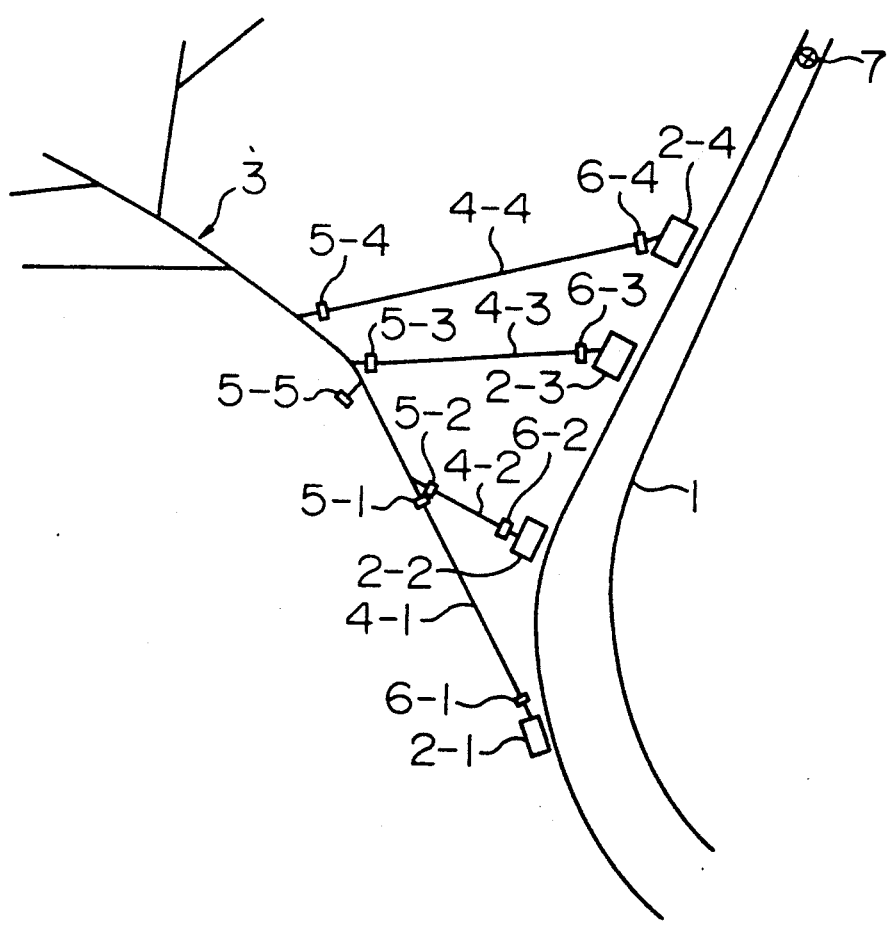
FIG. 2 shows an example of a drainage system according to an embodiment of the present invention.
Figure 3:
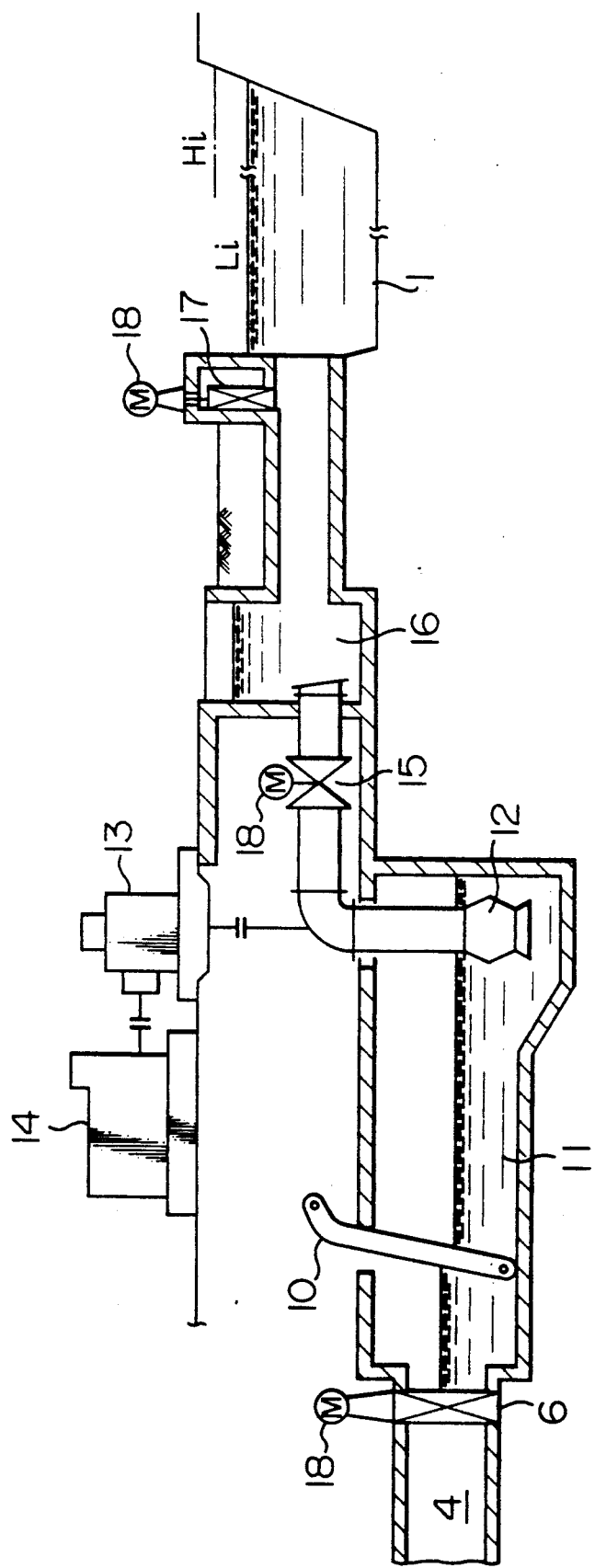
FIG. 3 is a cross section showing an example of a drainage pump facility.
Figure 4:
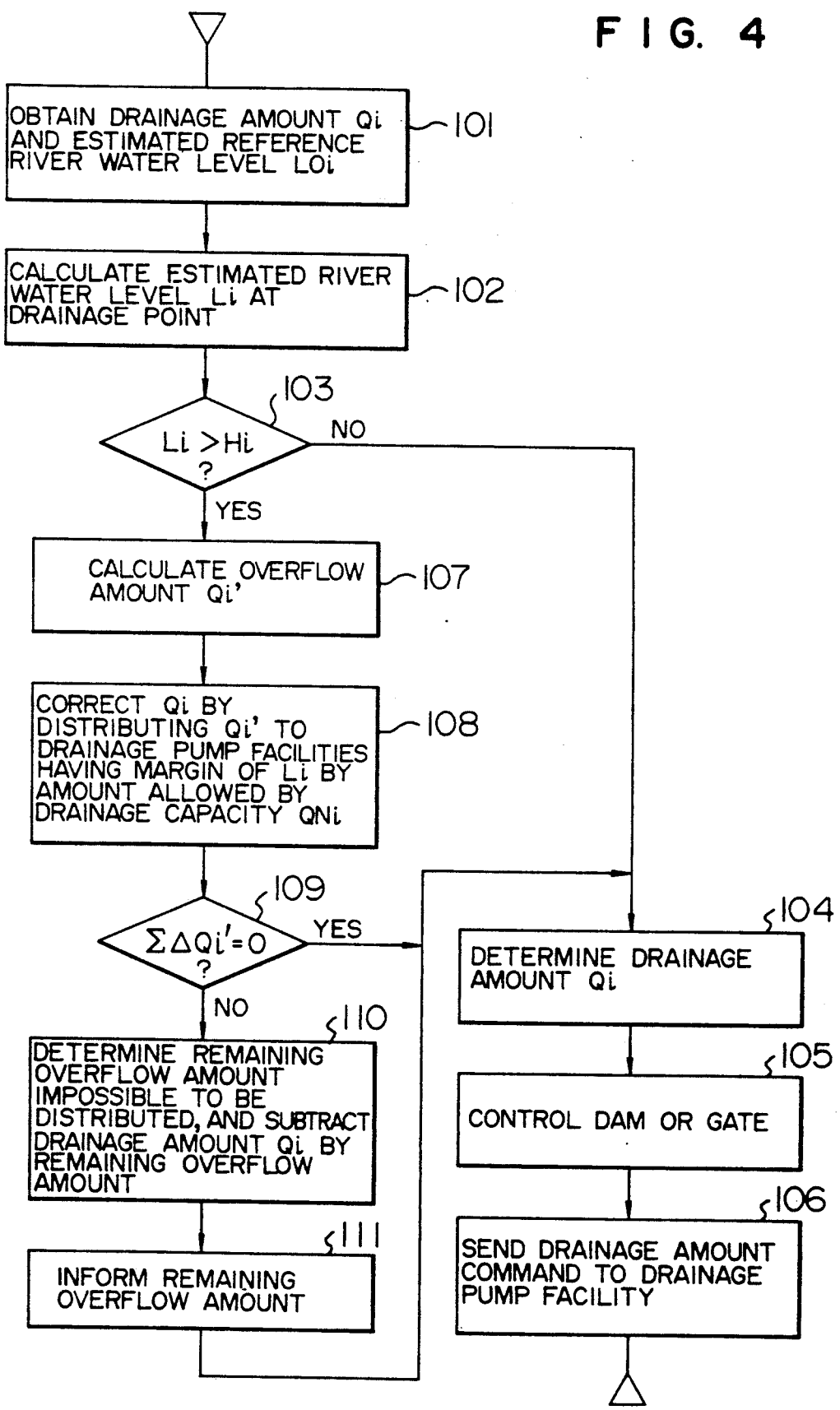
FIG. 4 is a flow chart showing an example of an input/output procedure of a drainage amount correcting means.
Figure 5:
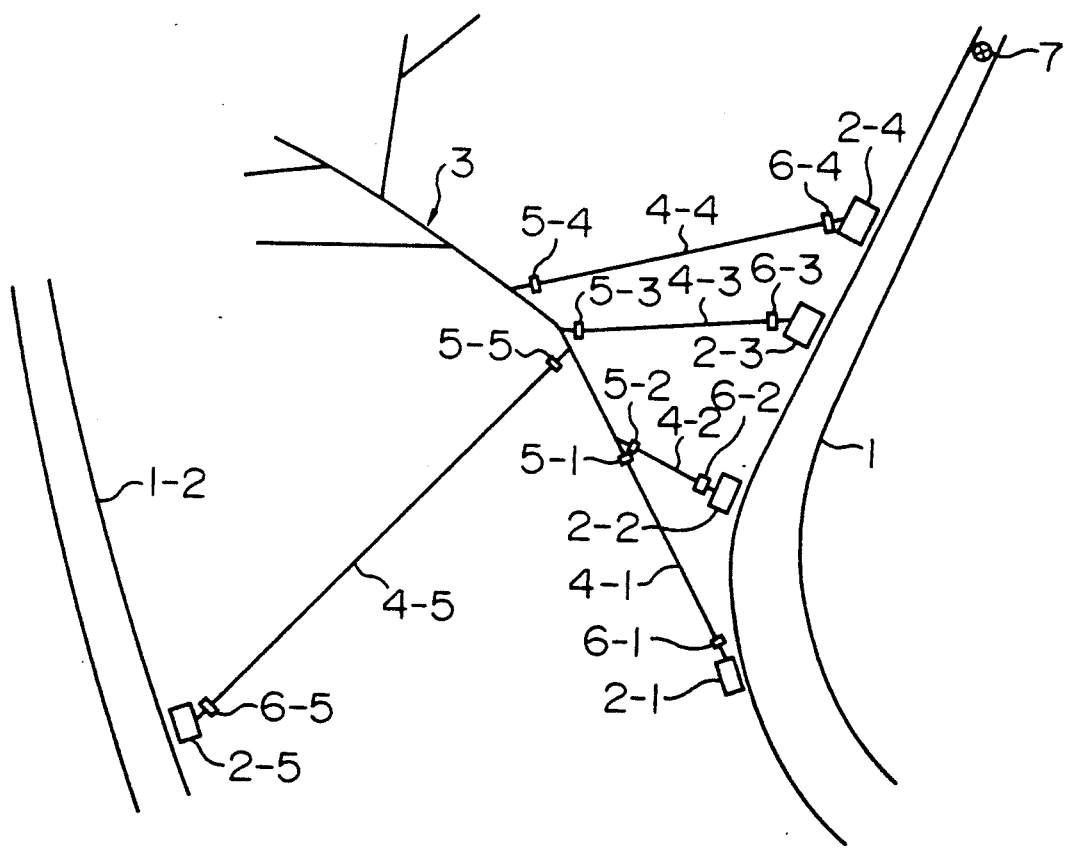
FIG. 5 shows an example of a drainage system according to another embodiment of the present invention.

A drainage system according to the embodiment of the present invention is shown in FIGS. 1 to 4. FIG. 1 is a block diagram showing the structure of a drainage distribution amount determining apparatus, FIG. 2 shows an example of a drainage system, FIG. 3 is a cross section showing an example of a drainage pump facility, and FIG. 4 is a flow chart showing an example of an input/output procedure of a drainage amount correcting unit. As shown in FIG. 2, in the drainage system of this embodiment, a plurality of drainage pump facilities 2-$i$ (where $i$ represents the number of each drainage pump facility, and takes the numbers 1 to 4 in this embodiment) are distributively disposed. Drain water such as rainwater is collected by a drainage path 3 including small rivers and disposed in a drainage district. This drain water is guided to each drainage pump facility 2-$i$ via a corresponding water conducting path 4-$i$ branched from the drainage path 3. The drain water is drained into a river 1. Each water conducting path 4-$i$ is provided with a dam 5-$i$ constructed at the branching point of the path 4-$i$, and a gate 6$i$ at the intake port of each drainage pump facility.

Each drainage pump facility 2-$i$ is constructed, for example, as shown in FIG. 3. In FIG. 3, drain water introduced from the water conducting path 4 flows via a gate 6 into a pump pool or sump 11. At the pump pool 11, there is installed a dust remover 10 for removing dust in drain water within the pump pool 11. A plurality of drainage pumps 12 are equipped, the intake port of each drainage pump 12 being immersed in the pump pool 11. In this embodiment, each drainage pump 12 is of an elevation type, and is driven by a motor 14 or engine while using a speed reducer 13. Drain water lifted up by the drainage pump 12 is ejected out via an ejector valve 15 into an eject water tank 16, and is drained into the river 1. A gate 17 is installed between the eject water tank 16 and the river 1. The gates 6 and 17, and ejector valve 15 are driven by a corresponding one of motors 18.

In the drainage system constructed as above, if the drainage amounts at respective drainage pump facilities 2-$i$ are controlled independently from each other by using as a reference an inside water level 1$i$ which is a water level at the pump pool 11$i$, it may occur a case that the total water amount introduced from the drainage path 3 to a drainage pump facility 2-$i$ cannot be drained completely, or a case that the water level Li at a drainage point exceeds an upper limit Hi. In view of this, according to the this embodiment, the distribution of drainage amounts at the drainage pump facilities 2-$i$ are arranged to be automatically determined by a drainage distribution amount determining apparatus shown in FIG. 1. The drainage distribution amount determining apparatus is installed at one of the drainage pump facilities 2-$i$ or at a central drainage controlling place to sent therefrom a drainage amount command or the like to the drainage pump facilities 2-$i$. As shown in FIG. 1, the drainage distribution amount determining apparatus is constructed of a data collecting unit 21, a total inflow amount estimating unit 22, a reference river water level estimating unit 23, a drainage amount distributing unit 24, and a drainage amount correcting unit 25.

The data collecting unit 21 collects data necessary for determining a distribution of drainage amounts in the drainage system, the data including an actual precipitation, an estimated precipitation, an upstream river water level, and the like. The data collecting unit 21 collects time sequentially such data, and if necessary, updates or averages the collected data, and performs other processing.

The total inflow amount estimating unit 22 estimates and records a total inflow amount QD (i.e., total drainage amount) as a function of time t of all the drainage pump facilities 2, in accordance with the area of a drainage district having the drainage path 3 and actual and estimated precipitations at the district. The estimated total inflow amount QD is updated, if necessary, in accordance with latest data.

The reference river water level estimating unit 23 monitors a change in a detected value by a water level detector 7 provided at an upstream point of the river 1 shown in FIG. 1. In accordance with the monitored result, the reference river water level estimating unit 23 estimates and records an estimated reference river water level $LOi$ as a function of time t at the drainage point of each drainage pump facility $2\text{-}i$. If necessary, the estimated value $LOi$ is updated in accordance with the latest data. The "reference river water level" herein used means a water level at the drainage point of each drainage pump facility $2\text{-}i$ when the drainage amount at the facility is assumed "0".

The drainage amount distributing unit 24 receives the estimated total inflow amount QD from the total inflow amount estimating unit 22, and temporarily determines a basic drainage distribution amount $Qi$ of each drainage pump facility $2\text{-}i$. Various methods can be considered for determining the basic drainage distribution amount. For example, the basic drainage distribution amount $Qi$ at each drainage pump facility $2\text{-}i$ is given by the following equation:

$$Qi = QD * QNi/QNT \quad (1)$$

where QNT is the total drainage capacity of all the drainage pump facilities, and QNi is a drainage capacity (rated drainage amount) at each drainage pump facility $2\text{-}i$. The basic drainage distribution amount is therefore determined in proportion with the drainage capacity of each drainage pump facility.

The drainage amount correcting unit 25 corrects if necessary the drainage amount $Qi$ and sends it to each drainage pump facility $2\text{-}i$, in accordance with the procedure shown in FIG. 4, the estimated or obtained drainage amount $Qi$, and the estimated reference river water level $LOi$. Specifically, at step 101, the drainage amount correcting unit 25 receives each drainage amount $Qi$ and each estimated reference river water level $LOi$. Next, at step 102 an estimated river water level $Li$ at each drainage point is calculated assuming that water is drained at the drainage amount $Qi$. At step 103 the estimated water level $Li$ is compared with the corresponding upper limit $Hi$ of the river water level. If all the estimated river water levels $Li$ are equal to or lower than the corresponding ones of the upper limits $Hi$, then the control advances to step 104 whereat the drainage amount $Qi$ at each drainage pump facility is determined as the value determined by the drainage amount distributing unit 24. Next, at step 105, in accordance with the determined drainage amount $Qi$, at least one of the dam $5\text{-}i$ and gate $6\text{-}i$ is controlled to adjust the amount of drain water flowing into each drainage pump facility. Thereafter at step 106, the determined drainage amount $Qi$ is sent as a drainage amount command to each drainage pump facility, to complete the procedure. Since the inflow amount at each pump pool is regulated by at least one of the dam $5\text{-}i$ and gate $6\text{-}i$, the inflow amount becomes equal to the determined drainage amount. As a result, the drainage amount is not necessary to be controlled by the drainage pump. Namely, each drainage pump is operated using the inside water level as a reference, same as a conventional manner, but at least one of the dam $5\text{-}i$ and gate $6i$ is operated to maintain the inside water level within a predetermined level. In this manner, the drainage amount drained by the drainage pump can be automatically maintained within the predetermined level in accordance with the inside water level at that time.

If it is judged at step 103 that some of the estimated river water level $Li$ will exceed the upper limit $Hi$, then the control advances to step 107 whereat there is obtained a sum $\Sigma\Delta Qi'$ of overflow drainage amounts $\Delta Qi'$ at respective drainage pump facilities having the estimated value $Li$ in excess of the upper limit $Hi$. The overflow drainage amount or marginal drainage amount at each drainage point is obtained from the following equation (2):

$$\Delta Qi\ (\Delta Qi'\ \text{or}\ \Delta Qi'') = c\ (Li - Hi) \quad (2)$$

where a coefficient c is a value determined in accordance with the river cross section at each drainage point, flowing capacity and the like. If $\Delta Qi$ takes a positive value, it means the overflow drainage amount $\Delta Qi'$, and drainage amount $\Delta Qi''$.

Next, at step 108, the sum $\Sigma\Delta Qi'$ of overflow drainage amounts is distributed to drainage pump facilities having a marginal drainage amount to correct the drainage amount $Qi$. This method of correcting a distribution is realized for example by the following procedure.

First, the marginal drainage amount $\Delta QNi$ relative to the drainage capacity $QNi$ of each drainage pump facility $2\text{-}i$ is obtained by the following equation (3):

$$\Delta QNi = QNi - Qi \quad (3)$$

Next, this value $\Delta QNi$ is compared with the marginal drainage amount $\Delta Qi''$ obtained by the equation (2), and the smaller one is used as the marginal drainage amount of the drainage pump facility $2\text{-}i$. If the sum of marginal drainage amounts determined as above is larger than the sum $\Sigma\Delta Qi'$ of overflow drainage amounts, it is possible to solve the problem at the drainage point having the drainage amount in excess of the upper limit. Then, the drainage amount $Qi$ at each drainage pump facility $2\text{-}i$ is corrected in accordance with the marginal drainage amount $\Delta Qi''$ or $\Delta QNi$. At step 109, it is checked from $\Sigma\Delta Qi' = 0$ if the problem at the drainage point having the drainage amount in excess of the upper limit has been solved or not. In this case, the problem has been solved so that the control advances to step 104 to determine the corrected value as the drainage amount $Qi$, and thereafter the steps 105 and 106 are executed in the similar manner described above. If the judgment at step 109 is negated, the control advances to step 110 whereat the overflow drainage amount is distributed to drainage pump facilities having a marginal drainage amount, as much as possible, and the remaining drainage amount is judged as a drainage amount unable to be distributed. The remaining drainage amount is subtracted from the drainage amount in excess of the limit value at the drainage pump facility, the resultant value being used as the corrected drainage amount $Qi$. The drainage pump facility from which the remaining drainage amount is subtracted, may be changed to another drainage pump facility while considering the conditions of the whole drainage system. Next, an indication that the drainage amount $Qi$ has been reduced is displayed to alarm an operator. At step 104, the amount obtained at step 110 is eventually determined as the drainage amount $Qi$. Thereafter, in the similar manner described above, a drainage amount command is sent to each drainage pump facility to terminate the procedure.

According to the above-described embodiment, a plurality of drainage pump facilities 2-i are operated organically, and the drainage distribution amount at each drainage pump facility is determined in accordance with the estimated water amount flowing into the drainage path and each water conducting path. It is therefore possible to determine an optimum drainage distribution amount in the drainage system.

It is estimated if the drainage distribution amount causes the river water level at each drainage point to become in excess of the corresponding limit value. If it exceeds the limit value, the drainage amount is distributed to drainage pump facilities having a marginal drainage amount to correct the drainage distribution amount. It is therefore possible to operate each drainage pump facility at a maximum drainage amount not exceeding the river water level limit value at each drainage point, providing an optimum operation of the drainage system. For example, if the river is wider at a downstream drainage pump facility than at an upstream drainage pump facility and the river water level at the upstream drainage point exceeds the limit value, the drainage amount at the downstream drainage pump facility is increased so that the river water level at the upstream can be lowered and all the required drainage amount can be drained. Furthermore, if it is anticipated that the water amount will be reduced abruptly at a downstream within a predetermined time period before the drain water at an upstream reaches the downstream, and if the drainage pump facility at the upstream has a marginal drainage amount, the overflow drainage amount at the drainage pump facility at the downstream can be distributed to the upstream, providing a degree of freedom in operating the drainage system.

FIG. 4 shows an example of a drainage system according to another embodiment of the present invention. In this embodiment, there are two destination rivers into which water is drained. As shown in FIG. 4, near the destination river 1 shown in FIG. 2, there is another destination river 1-2. Drain water is introduced via the same drainage path 3 to a water conducting path 4-5, and via a drainage pump facility 2-5 to the river 1-2. If there is a fear that the river water level at a drainage point of the river 1-2 exceeds a limit value, the overflow drainage amount is distributed to a drainage pump facility or facilities of the river 1, so that the water level can be lowered to the limit value or less. In this manner, if there is a drainage point having a river water level in excess of the limit value, the drainage amount is increased relative to the river having the marginal flowing capacity under the limit value, thereby providing an optimum operation of the drainage system.

As described so far, acccording to the present invention, the following advantageous effects can be obtained.

A plurality of drainage pump facilities 2-b are operated organically, and the drainage distribution amount at each drainage pump facility is determined in accordance with the estimated water amount flowing into the drainage path. It is therefore possible to determine an optimum and organized drainage distribution amount in the drainage system.

It is estimated if the drainage distribution amount causes the river water level at each drainage point to become in excess of the corresponding limit value. If it exceeds the limit value, the drainage amount is distributed to drainage pump facilities having a marginal drainage amount to correct the drainage distribution amount. It is therefore possible to operate each drainage pump facility at a maximum drainage amount not exceeding the river water level limit value at each drainage point, providing an optimum operation of the drainage system with a higher degree of freedom. If the drainage system has different destination rivers, it can be operated in a further improved manner.

What is claimed is:

1. A method of determining a drainage distribution amount for a drainage system wherein drain water is collected from a drainage path including a small river, guided to a plurality of drainage pump facilities, and drained into a destination river, said method comprising the steps of:

determining a drainage distribution amount for each of said plurality of drainage pump facilities in accordance with an actual precipitation or estimated precipitation;

estimating a river water level at a drainage point of each of said plurality of drainage pump facilities in accordance with said drainage distribution amount and a change in a detected water level at an upstream of said destination river; and correcting said drainage distribution amount for each of said plurality of drainage pump facilities so as to make said estimated river water level have a value equal to or smaller than an upper limit of said river water level at said drainage point.

2. A method of determining a drainage distribution amount for a drainage system according to claim 1, said correcting step includes a step for controlling a dam or gate provided at a water conducting path for conducting drain water to each of said plurality of drainage pump facilities.

3. A method of determining a drainage distribution amount for a drainage system wherein drain water is collected from a drainage path including a small river, guided to a plurality of drainage pump facilities, and drained into two or more destination rivers, said method comprising the steps of:

determining a drainage distribution amount for each of said plurality of drainage pump facilities in accordance with an actual precipitation or estimated precipitation;

estimating a river water level at a drainage point of each of said plurality of drainage pump facilities in accordance with said drainage distribution amount and a change in a detected water level at an upstream of each of said two or more destination rivers; and correcting said drainage distribution amount for each of said plurality of drainage pump facilities so as to make said estimated river water level have a value equal to or smaller than an upper limit of said river water level at said drainage point.

4. A method of determining a drainage distribution amount for a drainage system according to claim 3, wherein when said estimated river water level at a drainage point at one of said two or more destination rivers exceeds said upper limit, said drainage distribution amount for said plurality of drainage pump facilities at the other of said two or more destination rivers is preferentially corrected by increasing said drainage distribution amount.

5. A drainage system having a drainage path including a small river into which drain water such as a rainwater flows, a plurality of drainage pump facilities disposed near a destination river, and a plurality of water conducting paths branched from the drainage path for guiding the drain water to the plurality of drainage pump facilities from which the drain water is drained into the destination river, said drainage system comprising:

- total inflow amount estimating means for estimating a total inflow amount of said drain water flowing into said plurality of drainage pump facilities in accordance with an actual precipitation or estimated precipitation;
- water level detecting means disposed at an upstream of said destination river;
- reference river water level estimating means for estimating a reference river water level at a drainage point at each of said plurality of drainage pump facilities in accordance with an output from said water level detecting means;
- drainage distribution amount determining means for determining a drainage distribution amount for each of said plurality of drainage pump facilities in accordance with said estimated total inflow amount and a drainage capacity at each of said plurality of drainage pump facilities; and
- drainage amount correcting means for estimating a river water level at a drainage point at each of said plurality of drainage pump facilities in accordance with said determined drainage amount and said estimated reference river water level, comparing said estimated river water level with an upper limit of said river water level at said drainage point, and if there is said drainage point having said estimated river water level in excess of said upper limit, correcting said determined drainage distribution amount so as to make said drainage point have said estimated river water level not in excess of said upper limit.

6. A drainage system having a drainage path including a small river into which drain water such as a rainwater flows, a plurality of drainage pump facilities disposed near a destination river, and a plurality of water conducting paths branched from the drainage path for guiding the drain water to the plurality of drainage pump facilities from which the drain water is drained into the destination river, said drainage system comprising:

- total inflow amount estimating means for estimating a total inflow amount of said drain water flowing into said plurality of drainage pump facilities in accordance with an actual precipitation or estimated precipitation;
- water level detecting means disposed at an upstream of said destination river;
- reference river water level estimating means for estimating a reference river water level at a drainage point at each of said plurality of drainage pump facilities in accordance with an output from said water level detecting means;
- drainage distribution amount determining means for determining a drainage distribution amount for each of said plurality of drainage pump facilities in accordance with said estimated total inflow amount and a drainage capacity at each of said plurality of drainage pump facilities; and
- drainage amount correcting means for estimating a river water level at a drainage point at each of said plurality of drainage pump facilities in accordance with said determined drainage amount and said estimated reference river water level, comparing said estimated river water level with an upper limit of said river water level at said drainage point, if there is said drainage point having said estimated river water level in excess of said upper limit, obtaining an overflow drainage amount corresponding to an amount in excess of said upper limit, correcting said drainage amount for some of said plurality of drainage pump facilities having a marginal drainage amount relative to said upper limit at said drainage point, by increasing said drainage amount within said marginal drainage amount, and irrespective of said correction if there is still said drainage point having said estimated river water level in excess of said upper limit, correcting said drainage amount for some of said plurality of drainage pump facilities having said estimated drainage amount in excess of said upper limit, by deceasing said drainage amount by a remaining amount of said overflow drainage amount.

7. A drainage system having a drainage path including a small river into which drain water such as a rainwater flows, a plurality of drainage pump facilities disposed near two or more destination rivers, and a plurality of water conducting paths branched from the drainage path for guiding the drain water to the plurality of drainage pump facilities from which the drain water is drained into the two or more destination rivers, said drainage system comprising:

- total inflow amount estimating means for estimating a total inflow amount of said drain water flowing into said plurality of drainage pump facilities in accordance with an actual precipitation or estimated precipitation;
- water level detecting means disposed at an upstream of each of said two or more destination rivers;
- reference river water level estimating means for estimating a reference river water level at a drainage point at each of said plurality of drainage pump facilities in accordance with an output from said water level detecting means;
- drainage distribution amount determining means for determining a drainage distribution amount for each of said plurality of drainage pump facilities in accordance with said estimated total inflow amount and a drainage capacity at each of said plurality of drainage pump facilities; and
- drainage amount correcting means for estimating a river water level at a drainage point at each of said plurality of drainage pump facilities in accordance with said determined drainage amount and said estimated reference river water level, comparing said estimated river water level with an upper limit of said river water level at said drainage point, and if there is said drainage point having said estimated river water level in excess of said upper limit, correcting said determined drainage distribution amount so as to make said drainage point have said estimated river water level not in excess of said upper limit,
- said drainage amount correcting means correcting said drainage amount for said plurality of drainage pump facilities at said drainage point at said two or more destination rivers other than said destination river having said estimated value in excess of said upper limit, by increasing said drainage amount.

8. A drainage system according to claim 6, further comprising inflow amount adjusting means provided at one of each branching point of said water conducting path from said drainage path and each intake point of each of said plurality of drainage pump facilities, and inflow amount controlling means for controlling said inflow amount adjusting means in accordance with said drainage amount so as to maintain the water level of a pump pool within a predetermined range.

9. A drainage system according to claim 7, further comprising inflow amount adjusting means provided at one of each branching point of said water conducting path from said drainage path and each intake point of each of said plurality of drainage pump facilities, and inflow amount controlling means for controlling said inflow amount adjusting means in accordance with said drainage amount so as to maintain the water level of a pump pool within a predetermined range.

* * * * *